(12) United States Patent
Krueger

(10) Patent No.: US 12,249,060 B2
(45) Date of Patent: *Mar. 11, 2025

(54) SYSTEMS AND METHODS FOR CALIBRATING IMAGE CAPTURING MODULES

(71) Applicant: BNSF Railway Company, Fort Worth, TX (US)

(72) Inventor: Darrell R. Krueger, Lecompton, KS (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,503

(22) Filed: Dec. 21, 2023

(65) Prior Publication Data
US 2024/0135522 A1    Apr. 25, 2024

Related U.S. Application Data

(63) Continuation of application No. 18/055,203, filed on Nov. 14, 2022, now Pat. No. 11,861,819, which is a
(Continued)

(51) Int. Cl.
G06T 7/00       (2017.01)
G06F 18/2431    (2023.01)
(Continued)

(52) U.S. Cl.
CPC ........ G06T 7/0004 (2013.01); G06F 18/2431 (2023.01); G06N 20/00 (2019.01); G06T 7/11 (2017.01); *G06T 2207/20132* (2013.01)

(58) Field of Classification Search
CPC ................... G06T 7/0004; G06T 7/11; G06T 2207/20132; G06T 2207/30204;
(Continued)

(56) References Cited

U.S. PATENT DOCUMENTS

| 17,911 A | 7/1857 | White |
| 70,283 A | 10/1867 | Staley |

(Continued)

FOREIGN PATENT DOCUMENTS

| CN | 102954191 A | 1/2013 |
| CN | 111256586 A | 6/2020 |

(Continued)

OTHER PUBLICATIONS

Faghih-Roohi, S. et al., "Deep Convolutional Neural Networks for Detection of Rail Surface Defects," 2016 International Joint Conference on Neural Networks (IJCNN), Jul. 24-29, 2016, pp. 2584-2589.
(Continued)

*Primary Examiner* — Ali Bayat
(74) *Attorney, Agent, or Firm* — Whitaker Chalk Swindle & Schwartz PLLC; Enrique Sanchez, Jr.

(57) ABSTRACT

A system and method for calibrating a machine vision system on the undercarriage of a rail vehicle while the rail vehicle is in the field is presented. The system enables operators to calibrate the machine vision system without having to remove the machine vision system from the undercarriage of the rail vehicle. The system can capture, by a camera of an image capturing module, a first image of a target. The image capturing module and a drum can be attached to a fixture and the target can be attached to the drum. The system can also determine a number of lateral pixels in a lateral pitch distance of the image of the target, determining a lateral object pixel size based on the number of lateral pixels, and determining a drum encoder rate based on the lateral object pixel size. The drum encoder rate can be programmed into a drum encoder.

20 Claims, 5 Drawing Sheets

Related U.S. Application Data continuation of application No. 17/702,521, filed on Mar. 23, 2022, now Pat. No. 11,508,055, which is a continuation-in-part of application No. 17/194,954, filed on Mar. 8, 2021, now Pat. No. 11,620,743, which is a continuation of application No. 16/196,990, filed on Nov. 20, 2018, now Pat. No. 10,984,521.

(51) Int. Cl.
   *G06N 20/00* (2019.01)
   *G06T 7/11* (2017.01)

(58) Field of Classification Search
   CPC ............ G06T 2207/30252; G06T 7/80; G06F 18/2431; G06N 20/00; G06V 10/225; G06V 2201/06
   USPC ........................................................ 382/141
   See application file for complete search history.

(56) References Cited

U.S. PATENT DOCUMENTS

| | | | |
|---|---|---|---|
| 88,091 A | 4/1869 | McMahen | |
| 122,569 A | 1/1872 | Chute | |
| 140,509 A | 7/1873 | Knox | |
| 171,704 A | 1/1876 | Swinburn | |
| 196,456 A | 10/1877 | Howard | |
| 304,083 A | 8/1884 | Edison | |
| 367,708 A | 8/1887 | Dudley | |
| 5,068,912 A * | 11/1991 | Concannon | G06K 7/10811 358/475 |
| 5,287,183 A * | 2/1994 | Thomas | H04N 23/81 348/E5.037 |
| 7,200,259 B1 | 4/2007 | Gold et al. | |
| 9,628,762 B2 | 4/2017 | Farritor | |
| 9,771,090 B2 | 9/2017 | Warta et al. | |
| 2001/0016061 A1 | 8/2001 | Shimoda et al. | |
| 2012/0300060 A1 | 11/2012 | Farritor | |
| 2013/0188194 A1 * | 7/2013 | Wallace | G01J 9/00 356/477 |
| 2014/0263652 A1 | 9/2014 | Auger | |
| 2015/0271201 A1 | 9/2015 | Ruvio et al. | |
| 2016/0104061 A1 * | 4/2016 | McGill | G06K 19/06112 235/491 |
| 2016/0231253 A1 | 8/2016 | Nygaard et al. | |
| 2017/0106885 A1 | 4/2017 | Singh | |
| 2018/0339720 A1 * | 11/2018 | Singh | G06T 7/001 |
| 2020/0019938 A1 | 1/2020 | Wang et al. | |
| 2020/0167772 A1 * | 5/2020 | Chakraborty | G06V 10/776 |
| 2020/0175352 A1 | 6/2020 | Cha et al. | |
| 2021/0287402 A1 | 9/2021 | Kruger et al. | |

FOREIGN PATENT DOCUMENTS

| | | |
|---|---|---|
| EP | 1236634 A1 | 9/2001 |
| JP | 2008502538 A | 1/2008 |
| JP | 2008505260 A | 2/2008 |
| JP | 201039317 A | 6/2010 |
| JP | 2012026982 A | 2/2012 |
| JP | 2016109495 A | 6/2016 |
| JP | 2016142601 A | 8/2016 |
| JP | 2017187487 A | 10/2017 |
| JP | 2018005640 A | 1/2018 |
| WO | 2006004846 A2 | 1/2006 |
| WO | 2018165753 A1 | 9/2018 |

OTHER PUBLICATIONS

Nagata, F. et al., "Design Application of Deep Convolutional Neural Network for Vision-Based Defect Inspection," 2018 IEEE International Conference on Systems, Man, and Cybernetics (SMC), Oct. 7-10, 2018, pp. 1705-1710.

Papageorgiou, M. et al., "Transportation Systems 1997 (TS'97)," A Proceedings volume from the 8th IFAC/IFIP/IFORS Symposium, vol. 3, Published for the International Federation of Automatic Control, Jun. 18, 1997, pp. 1073-1076.

PCT International Application No. PCT/US2019/062145, international filing date Nov. 19, 2019, International Search Report and Written Opinion, 11 pages.

PCT International Application No. PCT/US2023/013956 International Search Report and Written Opinion, Jul. 27, 2023, 22 pages.

Frost, A Practical Guide to Using the In-Sight 5604 Line Scan Vision System, Oct. 10, 2014, 30 pages.

Anonymous, Understanding Line Scan Camera Applications, Mar. 20, 2014, 7 pages.

Steger et al., A Camera Modael for Line-Scan Cameras with Telecentric Lenses, Aug. 12, 2020, 20 pages.

* cited by examiner

SYSTEMS AND METHODS FOR CALIBRATING IMAGE CAPTURING MODULES

CROSS-REFERENCE TO RELATED APPLICATIONS

The present application is a Continuation of U.S. patent application Ser. No. 18/055,203, filed Nov. 14, 2022, which is a Continuation of U.S. patent application Ser. No. 17/702,521, filed Mar. 23, 2022, which is a Continuation-in-Part of U.S. patent application Ser. No. 17/194,954, filed Mar. 8, 2021, which is a Continuation of U.S. patent application Ser. No. 16/196,990, filed Nov. 20, 2018, the entireties of each are herein incorporated by reference for all purposes.

TECHNICAL FIELD

This disclosure generally relates to field calibration of image capturing modules, and more specifically to systems and methods for calibrating image capturing modules using a calibration bar.

BACKGROUND

Cameras and rotary encoders employed in machine vision systems of a rail vehicle must be calibrated and in synchronization to deliver a sharp, high contrast, and properly proportioned image. The rotary encoders on the rail vehicle trigger a camera controller to capture images of the track. Subsequently, machine vision object-detection models are only as good as the input images. During transit, machine vision systems can shift, no longer properly aiming at the track or capturing clear images. Additionally, rail vehicles generally require replacements and maintenance as the wheels and suspensions of the rail vehicle wear, which further impact the placement of the machine vision system. Accordingly, machine vision systems on the undercarriage of a rail vehicle require calibration to synchronize the rotary encoders with the camera to compensate for various image capture obstructions.

Calibrating the machine vision system on the undercarriage of the rail vehicle can include major operator intervention to remove the machine vision system and calibrate the system in a bench testing environment. After calibrating, the operators are then required to re-attach the machine vision system and repeat redundant processes including stopping the rail vehicle, reversing the rail vehicle, and repeatedly passing over a same stretch of track to ensure collection of appropriate images. The calibration process nonetheless can be arduous for the operators of the rail vehicle. The inefficient processes of modern calibration techniques can incur costly expenses from the repetitive processes, along with wasted time from the operators requiring the bench testing environment. The operators incur opportunity costs from the wasted time.

While the organizational tools and processes to calibrate machine vision system of the rail vehicles exist in a bench testing environment, the current processes are unfit for calibrating in the field. Additionally, the rail vehicles travel in all environmental conditions wearing the components of the rail vehicle and resulting in the movement of the machine vision system and distorted images. Operators currently cannot calibrate the machine vision system while the rail vehicle is in the field. When the operator needs to calibrate the machine vision system, current methods require the operator to remove the machine vision system and calibrate the machine vision system using the bench testing environment, which proves to be inefficient and burdensome for field operations.

SUMMARY

The present disclosure achieves technical advantages as a system and method for calibrating a machine vision system on the undercarriage of a rail vehicle while the rail vehicle is in the field. The system enables the operators of the rail vehicle to calibrate the machine vision system without having to remove the machine vision system from the undercarriage of the rail vehicle. In one embodiment, the rail vehicle can be a locomotive, rail car, or other suitable rail vehicle. The system can enable the operator to simplify the calibration process. Additionally, the present disclosure removes the need for a bench testing environment to calibrate the machine vision system. The system can take images of a target, compute an object pixel size of the image to ensure calibration of longitudinal measurements, and calibrate the rotary encoder with the camera of the machine vision system. The system can enable calibration of the rail vehicle components in the field to compensate for the misalignment of the machine vision system and provide safe travel.

The present disclosure solves the technological problem of requiring a bench testing environment for calibrating a machine vision system of a rail vehicle by providing a modular calibration target for field calibration of the machine vision system. The present disclosure goes beyond mere bench testing for calibration, incorporating at least the modular calibration target and image analysis functionality that can enable accurate calibration for enhanced rail vehicle safety. The present disclosure can remove the requirement of using a drum to calibrate the machine vision system in the bench testing environment, by replacing the drum and the bench testing environment with the modular calibration target allowing the operator to calibrate the machine vision system in the field. By removing the requirement of the bench testing environment, the operators can increase efficiency of travel while ensuring rail vehicle safety.

The present disclosure improves the performance and functionality of the system itself by substituting a drum from a bench testing environment with a modular calibration target. The modular calibration target includes capabilities to adapt to various types of rail sizes, contrary to the current processes which lack adaptability. Additionally, the present disclosure includes software tools to calculate the calibration between a rotary encoder and a camera of the machine vision system based on pixel counts of images. The rotary encoder can execute according to the wheels of the rail vehicle, so as the wheels rotate the camera captures an image. Additionally, the system can compare the images captured to known distance values and calibrate the machine vision system based on the comparison.

The system can include an ability to filter electronic signals for triggering a camera controller to instruct a camera to capture images. The rotary encoder of the machine vision system can include software processes to filter the trigger signals to remove asynchronous signals. Current approaches cannot filter the electronic trigger signals resulting in distorted images. The quality of the images directly impacts the effectiveness of the machine vision system. The higher quality the images leads to higher granularity, which results in fewer gaps between pixels of the images from machine vision system.

It is an object of the invention to provide a method for calibrating an image capturing module. It is a further object of the invention to provide a calibration bar for calibrating an image capturing module. It is a further object of the invention to provide a computer-readable storage media for calibrating an image capturing module. It is a further object of the invention to provide a system for calibrating an image capturing module. These and other objects are provided by at least the following embodiments.

In one embodiment, a method, comprising: capturing, by a camera of an image capturing module attached to a vehicle, an image of a target, wherein the target is at least one calibration bar attached to a roadway; determining a number of lateral pixels in a lateral pitch distance of the image of the target; determining a lateral object pixel size based on the number of lateral pixels; determining a number of longitudinal pixels in a longitudinal pitch distance of the image; and comparing the number of lateral pixels to the number of longitudinal pixels. Wherein the method further comprising: determining, in response to comparing the number of lateral pixels to the number of longitudinal pixels, that the number of lateral pixels matches the number of longitudinal pixels; and calculating a vehicle encoder rate based on a field calibration assessment. Wherein the field calibration assessment includes a field calculation of the lateral object pixel size based on the number of lateral pixels and a determined number of pixels. Wherein the image further comprising programming the vehicle encoder rate into a vehicle encoder attached to a wheel of the vehicle. Wherein the vehicle encoder rate is based on a second relation of a triggering factor, a wheel circumference, and the object pixel size. Wherein the method further comprising: determining, in response to comparing the number of lateral pixels to the number of longitudinal pixels, that the number of lateral pixels does not match the number of longitudinal pixels; resolving a difference between the number of lateral pixels and the number of longitudinal pixels using new calibration information to calibrate the image capturing module; and transmitting the new calibration information. Wherein the method further comprising: focusing the camera of the image capturing module on the target under constant lighting conditions; and obtaining a maximum contrast between two pixels that identify a boundary of light and dark portions of the target. Wherein: the target includes an alternating pattern of a plurality of black and white sections; the lateral pitch distance represents a width of an end plate coupled to the target; and the longitudinal pitch distance represents a length of one section of the plurality of black and white sections.

In another embodiment, a calibration bar, comprising: at least two end plates; a target attached to the at least two end plates; an image capturing module attached to a fixture, wherein the image capturing module comprises a camera and the camera is operable to capture an image of the target; and one or more controllers communicatively coupled to a vehicle encoder and the camera, wherein the one or more controllers are operable to: determine a number of lateral pixels in a lateral pitch distance of the image of the target; determine a lateral object pixel size based on the number of lateral pixels; determine a number of longitudinal pixels in a longitudinal pitch distance of the image; and compare the number of lateral pixels to the number of longitudinal pixels. Wherein the one or more controllers are further operable to: determine, in response to comparing the number of lateral pixels to the number of longitudinal pixels, that the number of lateral pixels matches the number of longitudinal pixels; and calculate a vehicle encoder rate based on a field calibration assessment. Wherein the field calibration assessment includes a field calculation of the lateral object pixel size based on the number of lateral pixels and a determined number of pixels. Wherein the image further comprising programming the vehicle encoder rate into a vehicle encoder attached to a wheel of the vehicle. Wherein the vehicle encoder rate is based on a relation of a triggering factor, a wheel circumference, and the object pixel size. Wherein the one or more controllers are further operable to: determine, in response to comparing the number of lateral pixels to the number of longitudinal pixels, that the number of lateral pixels does not match the number of longitudinal pixels; resolve a difference between the number of lateral pixels and the number of longitudinal pixels using new calibration information to calibrate the image capturing module; and transmit the new calibration information. Wherein the one or more controllers are further operable to program the vehicle encoder rate into a vehicle encoder attached to a wheel of a vehicle. Wherein the camera of the image capturing module is further operable to adjust its focus on the target under constant lighting conditions to obtain a maximum contrast between two pixels that identify a boundary of light and dark portions of the target. Wherein: the target includes an alternating pattern of a plurality of black and white sections; the lateral pitch distance represents a width of an end plate coupled to the target; and the longitudinal pitch distance represents a length of one section of the plurality of black and white sections.

In another embodiment, one or more computer-readable storage media embodying instructions that, when executed by a processor, cause the processor to perform operations comprising: capturing, by a camera of an image capturing module attached to a vehicle, an image of a target, wherein the target is a calibration bar attached to a roadway; determining a number of lateral pixels in a lateral pitch distance of the image of the target; determining a lateral object pixel size based on the number of lateral pixels; determining a number of longitudinal pixels in a longitudinal pitch distance of the image; and comparing the number of lateral pixels to the number of longitudinal pixels. Wherein the operations further comprising: determining, in response to comparing the number of lateral pixels to the number of longitudinal pixels, that the number of lateral pixels matches the number of longitudinal pixels; and calculating a vehicle encoder rate based on a field calibration assessment. Wherein the field calibration assessment includes a field calculation of the lateral object pixel size based on the number of lateral pixels and a determined number of pixels. Wherein the image further comprising programming the vehicle encoder rate into a vehicle encoder attached to a wheel of the vehicle. Wherein the vehicle encoder rate is based on a relation of a triggering factor, a wheel circumference, and the object pixel size. Wherein the one or more controllers are further operable to: determine, in response to comparing the number of lateral pixels to the number of longitudinal pixels, that the number of lateral pixels does not match the number of longitudinal pixels; resolve a difference between the number of lateral pixels and the number of longitudinal pixels using new calibration information to calibrate the image capturing module; and transmit the new calibration information. Wherein the operations further comprising programming the vehicle encoder rate into a vehicle encoder attached to a wheel of the vehicle. Wherein the operations further comprising focusing the camera of the image capturing module on the target under constant lighting conditions to obtain a maximum contrast between two pixels that identify a boundary of light and dark portions of the target. Wherein: the target includes an alternating pattern of a plurality of black and white sections; the lateral pitch distance represents a width of an end plate coupled to the target; and the longitudinal pitch distance represents a length of one section of the plurality of black and white sections.

In another embodiment, a system, comprising: at least two end plates attached to a roadway comprising a visual marker perpendicular to the roadway; and a calibration bar attached to the at least two end plates comprising alternating visual markers along a length of the calibration bar. Wherein the at least two end plates can be magnetically attached to the roadway. Wherein the at least two end plates are operable with a plurality of rail sizes. Wherein the plurality of rail sizes includes a 112 pounds per yard rail, a 132 pounds per yard rail, a 136 pounds per yard rail, and a 141 pounds per yard rail. Wherein the visual marker perpendicular to the roadway is a black strip. Wherein each visual marker of the alternating visual markers along the length of the calibration bar are a same length. Wherein the alternating visual markers along the length of the calibration bar alternate between black and white paint. Wherein the calibration bar is a rigid material.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The disclosure presented in the following written description and the various features and advantageous details thereof, are explained more fully with reference to the non-limiting examples included in the accompanying drawings and as detailed in the description, which follow. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

Figure 1:
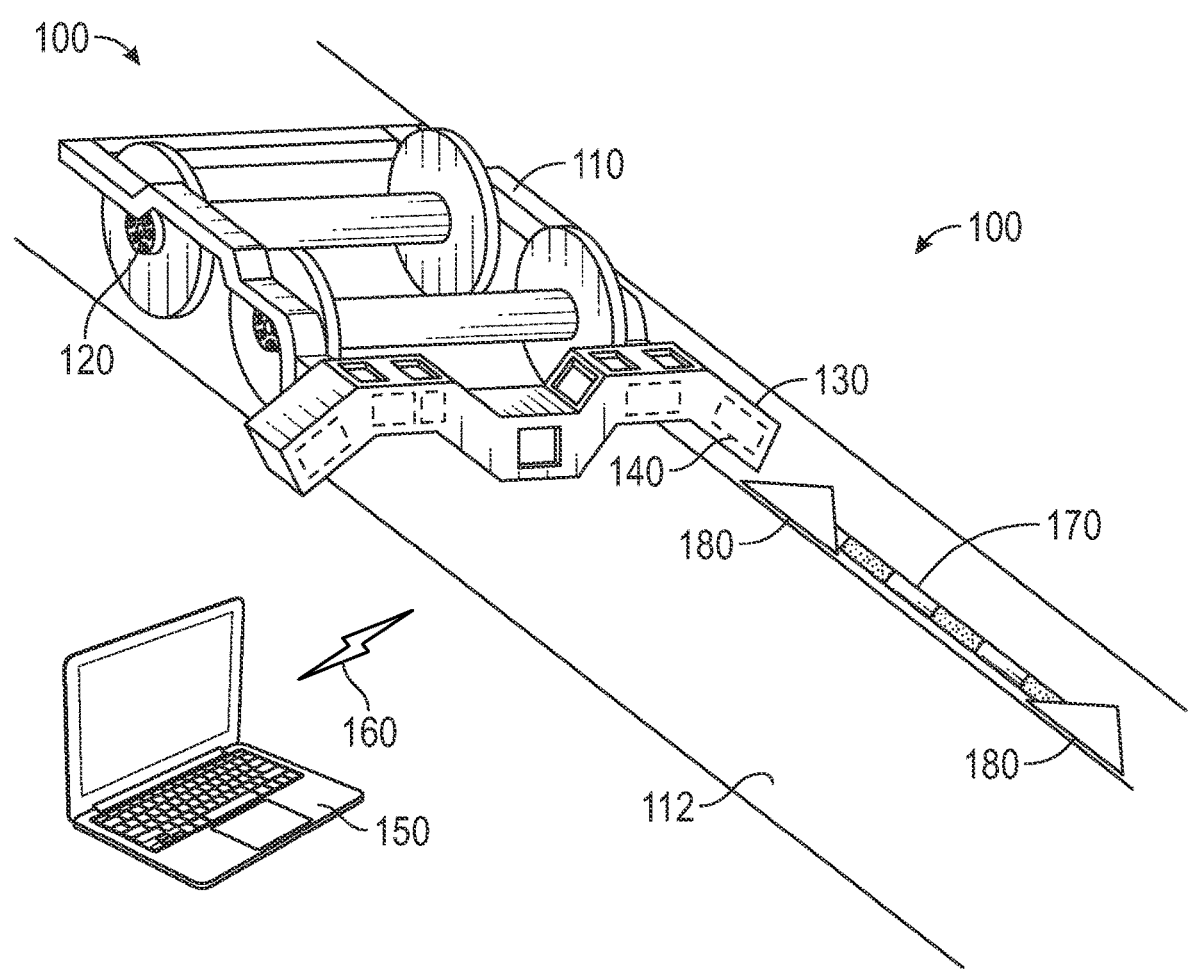
FIG. 1 illustrates a system for field calibrating an image capturing module and a vehicle encoder, in accordance with one or more exemplary embodiments of the present disclosure.

FIG. 1 illustrates an example system 100 for field calibrating an image capturing module 140. The system 100 or portions thereof can be associated with an entity, which can include any entity, such as a business, company (e.g., a railway company, a transportation company, etc.), or a government agency (e.g., a department of transportation, a department of public safety, etc.) that field calibrates image capturing module 140. The elements of the system 100 can be implemented using any suitable combination of hardware, firmware, and software. For example, the elements of the system 100 can be implemented using one or more components of the computer system of FIG. 5.

The system 100 includes a vehicle 110, a vehicle encoder 120, a beam 130, one or more image capturing modules 140, a computer 150, a network 160, a target 170, and end plates 180.

The vehicle 110 can include any machine capable of automated movement. Vehicle 110 can be a car, a rail vehicle, a truck, a bus, an aircraft, or any other machine suitable for mobility. The vehicle 110 can operate at any speed that allows one or more components (e.g., sensors, cameras, etc.) of beam 130 to capture images. For example, the vehicle 110 can be a rail bound vehicle that travels at 65 miles per hour (mph).

The roadway 112 can include any path that accommodates the vehicle 110. For example, the vehicle 110 can travel along the roadway 112. The roadway 112 can include a road, a highway, a railroad track, a water way, and the like.

The vehicle encoder 120 can include a rotary encoder or other timing device used to measure axle rotation. The vehicle encoder 120 can measure the number of times an axle makes a revolution. The vehicle encoder 120 can be attached to an axle of the vehicle 110. The vehicle encoder 120 can be physically and/or logically connected to one or more components of the system 100. For example, the vehicle encoder 120 can be physically and/or logically connected to one or more cameras and/or sensors of the image capturing module 140. As another example, the vehicle encoder 120 can be physically and/or logically connected to the computer 150.

The vehicle encoder 120 can communicate with a camera controller of the image capturing module 140 to ensure that a camera captures images of the same perspective and proportion regardless of the speed of travel of the vehicle 110. For example, the vehicle encoder 120 can be synchronized with multiple cameras of the image capturing modules 140 to ensure that all cameras are taking images at the same time. As another example, the vehicle encoder 120 can be synchronized with a camera of the image capturing module 140 to ensure that a camera traveling with the vehicle 110 at a first speed (e.g., 10 miles per hour) captures images that are the same perspective and proportion of a camera traveling with the vehicle 110 at a second speed (e.g., 65 miles per hour).

In another embodiment, the vehicle encoder 120 can couple with the vehicle 110 in a mechanical manner to reduce or eliminate lost motion resulting in undesirable artifacts in images generated from the image capturing module 140. For example, the lost motion can include slack in the mechanical coupling resulting in distortion in the images. In another embodiment, the mechanical manner can reduce the lost motion using components machined specifically for the vehicle encoder. For example, the components machined specifically for the vehicle encoder can ensure flexible and rigid fitting to minimize vibration and other mechanical interference resulting in the lost motion.

In another embodiment, the vehicle encoder 120 can couple with the image capturing module 140 in an electrical manner including an electronic filter. For example, the electronic filter can filter trigger signals sent to the camera of the image capturing module 140 smoothing the trigger filter signal to compensate for asynchronous signal elements. In one embodiment, the asynchronous signal elements can be smoothed from using an averaging filter to pass the trigger signal values over a user-defined time frame. For example, the averaging filter can recreate a smoothed trigger signal to distribute to the camera of the image capturing module 140. In another embodiment, the electronic filter is executed on an encoder controller and receives user-defined number of pulses from the vehicle encoder 120. In one embodiment, the electronic filter is executed on an encoder and receives a variable number of pulses over a user-defined time frame.

The beam 130 can include a structure that contains and orients components (e.g., the image capturing modules 140) used to capture images. In certain embodiments, the beam 130 operates similar to a flatbed document scanner with the exception that the beam 130 is in motion while capturing images of stationary physical objects. The beam 130 can engage with the vehicle 110. For example, the beam 130 can be bolted to a sub-frame attached to the vehicle 110. In the illustrated embodiment of FIG. 1, the beam 130 has three sections that include two end sections and a center section. The beam 130 has a gullwing configuration such that the center section bends inward toward the center of the beam 130. The gullwing configuration allows the image capturing components (e.g., sensors, cameras, etc.) of the image capturing modules 140 within the beam 130 to be properly oriented within with respect to the physical objects being captured. In certain embodiments, the center section of the beam 130 is omitted, and each end section is connected to vehicle 110. The beam 130 can be made of metal (e.g., steel or aluminum), plastic, or any other material suitable for housing components of the beam 130 and for attaching the beam 130 to the vehicle 110.

The beam 130 can include one or more openings. Openings can provide for the placement of the image capturing modules 140 within the beam 130. Openings can allow for installation, adjustment, and maintenance of the image capturing modules 140. While the beam 130 is illustrated in FIG. 1 as having a particular size and shape, the beam 130 can have any size and shape suitable to house and orient the image capturing modules 140. Other factors that can contribute to the design of the beam 130 include shock resistance, vibration resistance, weatherproofing considerations, durability, ease of maintenance, calibration considerations, and ease of installation.

In another embodiment, the beam 130 can include a plurality of sub-beams. For example, the beam 130 can include two separate sub-beams, each including a plurality of cameras. In one embodiment, the system 100 with the plurality of sub-beams can reduce complexity of maintenance and simplify construction of each of the sub-beams. In another embodiment, the system 100 with the plurality of sub-beams can reduce complexity of maintenance by reducing a number of personnel needed resulting in the maintenance of control in construction tolerances. For example, the sub-beams can include 33% fewer welds and cuts to construct compared to a full beam.

The image capturing modules 140 of system 100 are used to capture images while the vehicle 110 is in motion. Each the image capturing module 140 can include one or more sensors, one or more cameras, and the like. One or more the image capturing modules 140 can be attached to the vehicle 110 at any location that allows the image capturing modules 140 to capture images of the environment surrounding the vehicle 110. In the illustrated embodiment of FIG. 1, the image capturing modules 140 are located within the beam 130.

In certain embodiments, each end section of the beam 130 houses one or more the image capturing modules 140. For example, a first end section of the beam 130 can house the image capturing module 140 that includes two downward facing cameras that capture images of tie and ballast areas of a rail. The first end section of the beam 130 can house the two downward facing cameras in a portion of the first end section that is substantially horizontal to the rail. The second end section of the beam 130 opposite the first end section can house two of the image capturing modules 140 that each include two angled cameras that capture images of both sides of the rail and rail fastening system. The second end section of the beam 130 can house the four angled cameras in portions of the second end section that are at an angle (e.g., a 45 degree angle) to the rail.

The image capturing modules 140 can include various types of sensors depending on sensing and/or measuring requirements. In one embodiment, sensors housed by the image capturing modules 140 can include optical sensors (e.g., cameras for visible light (mono and color), infrared, UltraViolet, and/or thermal), motion sensors (e.g., gyroscopes and accelerometers), light detection and ranging (LIDAR) sensors, hyperspectral sensors, Global Positioning System (GPS) sensors, and the like. Optical sensors and lasers can be used together for laser triangulation to measure deflection or profile. LIDAR sensors can be used for generating three-dimensional (3D) point-cloud data. Hyperspectral sensors can be used for specific wavelength responses. An example of the image capturing module 140 is described in FIG. 2 below.

The computer 150 can represent any suitable computing component that can be used to process information for system 100. In one embodiment, the computer 150 can coordinate one or more components of system 100. In another embodiment, the computer 150 can receive data from the image capturing modules 140 and/or the vehicle encoder 120. The computer 150 can monitor inputs and/or outputs of the image capturing modules 140 and/or the vehicle encoder 120. In another embodiment the computer 150 can include a communications function that allows users (e.g., a technician) to engage the system 100 directly. For example, a user can access the computer 150 through an interface (e.g., a screen, a graphical user interface (GUI), or a panel) of the computer 150. The computer 150 can be a laptop computer, a desktop computer, a smartphone, a tablet, a personal digital assistant, a wearable device, and the like. The computer 150 can be located inside or external to the vehicle 110. The computer 150 can communicate with one or more components of the system 100 via the network 160.

The network 160 can include any type of network that facilitates communication between components of the system 100. One or more portions of the network 160 can include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a Long Term Evolution (LTE) cellular network, a combination of two or more of these, or other suitable types of networks. One or more portions of the network 160 can include one or more access (e.g., mobile access), core, and/or edge networks. The network 160 can be any communications network, such as a private network, a public network, a connection through Internet, a mobile network, a Wi-Fi network, a Bluetooth network, etc. One or more components of system 100 can communicate over the network 160. For example, the computer 150 can communicate over the network 160, including receiving information from the image capturing modules 140 and/or the vehicle encoder 120.

The target 170 can include an object used to calibrate the image capturing module 140 and/or the vehicle encoder 120. For example, the target 170 can include a calibration bar. In another embodiment, the calibration bar can include a cylindrical object made of a sturdy material. For example, the sturdy material can include aluminum (or some other metal), PVC, wood, or some other material suitable for stabilizing the calibration bar. In another embodiment, the target 170 can include a calibration pattern, which can be any suitable size, shape, and/or design. For example, the calibration pattern design can include alternating solid colors, a checkerboard pattern, a chessboard pattern, a circle grid pattern, a CharucoBoard pattern, and the like. For example, the calibration pattern can be a printed black-and-white alternating pattern that includes multiple black and white sections. In another embodiment, the calibration pattern can include units with an unequal length to width ratio. For example, the length of each unit can be twice as long as the width of each unit.

The end plates 180 can include at least one object to which the target 170 attaches. For example, the end plates 180 can include structures to stabilize a position of the target 170. In one embodiment, the structures can be metallic (e.g., aluminum), plastic, wooden, or some other sturdy material for stabilizing the target 170. In another embodiment, the end plates 180 can be used to stabilize the target 170 for purposes of calibrating the image capturing module 140. In one embodiment, the end plates 180 are placed along the rail by the operator. For example, the end plates 180 can include components small and light enough to be movable for the operator. Alternatively, the end plates 180 can be stationary, as part of the rail.

In operation, a vehicle encoder rate is programmed into the vehicle encoder 120. The vehicle encoder rate is a number of electrical pulses generated by vehicle encoder 120 in one revolution of a shaft of the vehicle encoder 120. The vehicle encoder rate can be determined from calibration data previously generated during calibration procedures, as described in FIGS. 3 and 5 below. If calibration data is not available, an arbitrary initial value for the vehicle encoder rate can be programmed into the vehicle encoder 120. In certain embodiments, the vehicle encoder rate that is programmed into the vehicle encoder 120 is an integer. In certain embodiments, an operator programs the vehicle encoder rate into the vehicle encoder 120.

The vehicle encoder 120 and the image capturing module 140 of the system 100 are secured to the vehicle 110. The target 170 can be secured to the roadway 112 in view of the camera of the image capturing module 140 to be calibrated. The target 170 is located perpendicularly to the axis of the camera of the image capturing module 140. The camera of the image capturing module 140 is activated, and an operator observes the current focus of the camera under constant lighting conditions. If the contrast between two pixels identifying the boundary of light and dark portions of the target 170 is less than a maximum obtainable contrast (or less than observed during bench calibration procedures), the operator unlocks the focus mechanism of the camera and adjusts the focus until a maximum contrast is achieved. The focus mechanism is then locked.

The image capturing module 140 is connected to the computer 150 via the network 160. The computer 150 includes image capturing software. The image capturing module 140 captures a first image of the target 170, which is displayed on the computer 150. The operator determines a number of lateral pixels in a lateral pitch distance of the first image of the target 170 and determines a lateral object pixel size (OPS) by dividing the pitch of the target 170 by the number of lateral pixels in the pitch region. A trial vehicle encoder rate is then determined by dividing the wheel circumference of the vehicle 110 by the lateral OPS. If the trial vehicle encoder rate is different than the initial vehicle encoder rate programmed into the vehicle encoder 120, the trial vehicle encoder rate is programmed into the vehicle encoder 120. The image capturing software of the computer 150 is triggered off of the vehicle encoder 120 and the vehicle 110 is moved forward or backward over the target 170.

The image capturing device 140 captures second images of the target 170 while the vehicle 110 is moved over the target 170. An operator of the computer 150 determines (e.g., counts) a number of light or dark longitudinal pixels in one longitudinal pitch distance of each of the second images and compares the number of lateral pixels to the number of longitudinal pixels. If the number of lateral pixels matches the number of longitudinal pixels, the image capturing module 140 and the vehicle encoder 120 are calibrated. If the number of lateral pixels is different from the number of longitudinal pixels, the vehicle encoder rate is adjusted until number of lateral pixels matches the number of longitudinal pixels. As such, the system 100 can be used to calibrate the image capturing module 140 and the vehicle encoder 120 to ensure sufficient images are captured by the system 100 that can be used to accurately identify objects in the environment surrounding the vehicle 110.

Although FIG. 1 illustrates a particular arrangement of the vehicle 110, the vehicle encoder 120, the beam 130, the image capturing modules 140, the computer 150, the network 160, and the target 170, this disclosure contemplates any suitable arrangement of the vehicle 110, the vehicle encoder 120, the beam 130, the image capturing modules 140, the computer 150, the network 160, the target 170, and the end plates 180. For example, the computer 150 can be located inside the vehicle 110. The vehicle 110, the vehicle encoder 120, the beam 130, the image capturing modules 140, and the computer 150 can be physically or logically co-located with each other in whole or in part.

Although FIG. 1 illustrates a particular number of the vehicles 110, vehicle encoders 120, beams 130, image capturing modules 140, computers 150, networks 160, and targets 170, this disclosure contemplates any suitable number of the vehicles 110, vehicle encoders 120, beams 130, image capturing modules 140, computers 150, networks 160, targets 170, and end plates 180. For example, the system 100 can include a first beam at a front end of the vehicle 110 and a second beam at a rear end of the vehicle 110. As another example, the system 100 can include multiple computers 150. One or more components of the system 100 can be implemented using one or more components of the computer system of FIG. 5.

Figure 2:
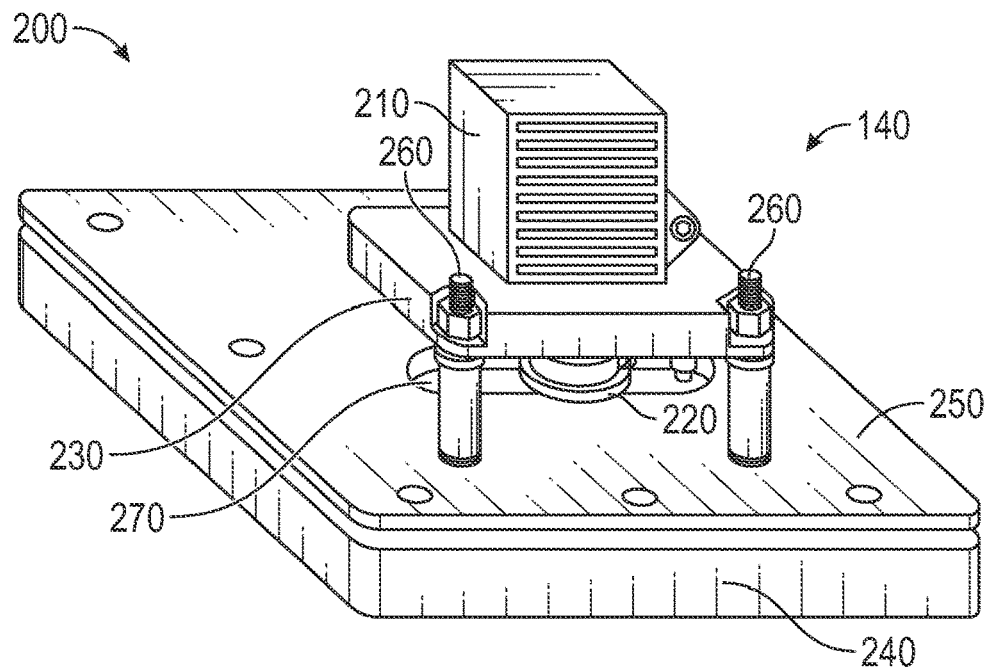
FIG. 2 illustrates an image capturing module, in accordance with one or more exemplary embodiments of the present disclosure.

FIG. 2 illustrates an example image capturing module 140 that can be used by the system 100. Image capturing module 140 includes a camera 210, a lens 220, a top plate 230, a base plate 240, a cover plate 250, bolts 260, and an opening 270. Camera 210 is any device that captures images. For example, camera 210 can capture images of the target 170 and end plates 180 of FIG. 1. As another example, camera 210 can capture images of a rail component (e.g., a rail joint, a switch, a frog, a fastener, ballast, a rail head, and/or a rail tie). In certain embodiments, camera 210 includes one or more sensors.

One or more cameras 210 can capture images from different angles. For example, one or more cameras 210 can capture images of both rails of a railway system at any given location. Each beam (e.g., beam 130 of FIG. 1) can include multiple cameras 210. The beam can include first camera 210 aimed straight down to capture an overhead image of a target (e.g., target 170 of FIG. 1), a physical object, etc. The beam can include second camera 210 aimed downward and outward to capture an angled image of the target, a physical object, etc.

Camera 210 can be a line scan camera. A line scan camera includes a single row of pixels. Camera 210 can be a dual line scan camera. A dual line scan camera includes two rows of pixels that can be captured and/or processed simultaneously. As camera 210 moves over a physical object, camera 210 can capture images such that a complete image of the physical object can be reconstructed in software line by line. Camera 210 can have a capture rate up to 140 kilohertz. Camera 210 can have a resolution and optics to detect physical objects of at least $\frac{1}{16}$ inches in size. In one or more embodiments, camera 210 includes lens 220 that focuses and directs incident light to a sensor of camera 210. Lens 220 can be a piece of glass or other transparent substance. Lens 220 can be made of any suitable material (e.g., steel, aluminum, glass, plastic, or a combination thereof.)

Top plate 230 and base plate 240 are structural elements used to position, support, and/or stabilize one or more components of image capturing module 140 (e.g., camera 210 or a sensor). Top plate 230 and bottom plate 540 can be made of any suitable material (e.g., steel, aluminum, plastic, glass, and the like). Top plate 230 can be connected to base plate 240 with one or more bolts 260. Bolts 260 (e.g., jack bolts) can be used to alter a pitch and/or roll orientation of camera 210. For example, bolts 260 can be used to change an effective height between top plate 230 and base plate 240. Top plate 230 and/or base plate 240 can be adjusted to reduce vibration and/or shock of image capturing module 140. Top plate 230 and/or base plate 240 can include resistive heating elements to provide a warm environment for camera 210 and lens 220 to operate during cooler weather.

Cover plate 250 can be a plate that covers base plate 240. Cover plate 250 can be made of any suitable material (e.g., glass, steel, aluminum, and the like). Cover plate 250 includes an opening 270. Opening 270 can serve as an aperture through which a lens of camera 210 views the physical object. Opening 270 allows for transmission of a sensed signal from the surrounding environment to reach a sensor of camera 210. Opening 270 can be any suitable size (e.g., oval, rectangular, and the like) to accommodate views of camera 210. Lens 220 of camera 210 can be positioned directly over opening 270.

Although FIG. 2 illustrates a particular arrangement of camera 210, lens 220, top plate 230, base plate 240, cover plate 250, bolts 260, and opening 270, this disclosure contemplates any suitable arrangement of camera 210, lens 220, top plate 230, base plate 240, cover plate 250, bolts 260, and opening 270. Although FIG. 2 illustrates a particular number of cameras 210, lenses 220, top plates 230, base plates 240, cover plates 250, bolts 260, and openings 270, this disclosure contemplates any suitable number of cameras 210, lenses 220, top plates 230, base plates 240, cover plates 250, bolts 260, and openings 270. For example, image capturing module 140 can include multiple cameras 210. As another example, in certain embodiments, image capturing module 140 cannot include certain components (e.g., base plate 240) illustrated in FIG. 2. One or more components of image capturing module 140 can be implemented using one or more elements of the computer system of FIG. 5.

Figure 3:
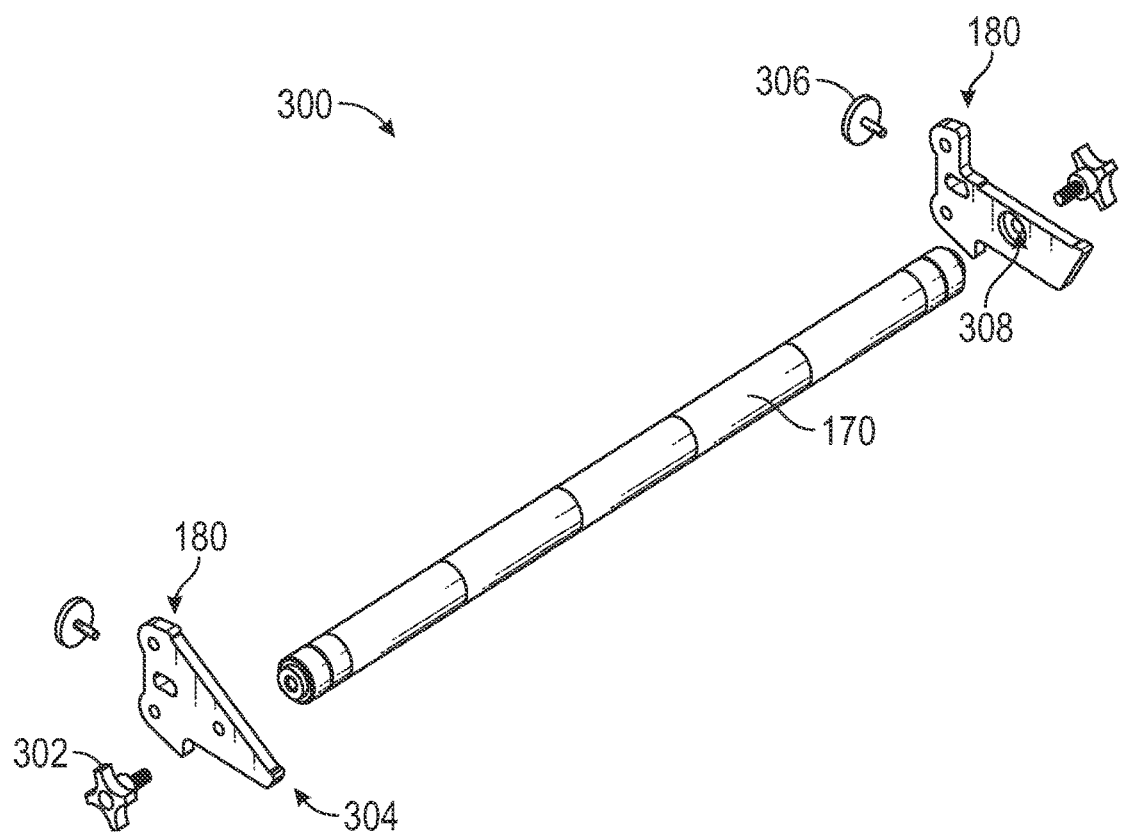
FIG. 3 illustrates a system for an adaptable calibration target, in accordance with one or more exemplary embodiments of the present disclosure.

FIG. 3 illustrates an example system 300 for an adaptable calibration target. System 300 includes a roadway (e.g., roadway 112 of FIG. 1) moving under a rail vehicle. System 300 or portions thereof can be associated with an entity, which can include any entity, such as a business, company (e.g., a railway company, a transportation company, etc.), or a government agency (e.g., a department of transportation, a department of public safety, etc.) that calibrates an image capturing module in the field. System 300 of FIG. 3 includes the target 170, the end plates 180, a screw caps 302, a marker strip 304, an attachment apparatus 306, and fastener hole 308.

The screw caps 302 can couple the target 170 to the end plates 180. For example, the screw caps 302 can include a mechanical coupler, such as a screw, bolt, cotter pin, or another mechanical coupler. In one embodiment, the operator of the rail vehicle will exit the rail vehicle, attach the end plates 180 to a rail, and couple each end of the target 170 to each of the end plates 180 using the screw caps 302. In another embodiment, the operator can rotate the screw caps 302 to attach and detach the system in the field.

The marker strip 304 can include a solid black strip on a top of the end plates. For example, the marker strip 304 can include a strip of known length for calibration purposes. In one embodiment, the marker strip 304 can be used to calibrate an image system on the rail vehicle by providing a known lateral distance. For example, the marker strip 304 can include a length of 5 inches. In another embodiment, the image system can capture an image of the marker strip 304 and analyze the image to determine whether the image system is calibrated. In another embodiment, the image with the marker strip 304 can provide a number of lateral pixels for analysis.

The attachment apparatus 306 can couple the end plates 180 to the rail. For example, the attachment apparatus 306 can couple the end plates 180 to the rail by a mechanical, electrical, or magnetic manner. In one embodiment, the attachment apparatus 306 can include a mechanical component to couple the end plates 180 to the rail. For example, the mechanical component can include a clamp, bolt, screw, cotter pin, or some other mechanical coupler. In another embodiment, the attachment apparatus 306 can include an electrical component to couple the end plates 180 to the rail. For example, the electrical component can include an electromechanical clamp, electromagnetic coupler, or some other electrical coupler. In another embodiment, the attachment apparatus 306 can include a magnetic component to couple the end plates 180 to the rail. For example, the magnetic component can include a magnetic disc, strip, or paint manually placed by the operator. In another embodiment, the attachment apparatus 306 can be removable from the end plates 180. Alternatively, the attachment apparatus 306 can be permanently attached to the end plates 180.

The fastener hole 308 can couple the target 170 to the end plates 180. For example, the fastener hole 308 can interconnect the target 170 to the screw caps 302. In another embodiment, the fastener hole 308 can be part of the end plates 180 or another base to which the target 170 is applied.

In operation, a user (e.g., an operator) installs an image capturing module (e.g., image capturing module 140 or portions thereof such as camera 210 of FIG. 2) on an undercarriage of a rail vehicle and connects one or more components of the image capturing module to a computer (e.g., computer 150). The computer can include image capturing software. The user turns (e.g., switches) on the power of the image capturing module. The user unlocks the focus locking mechanism of the image capturing module and focuses a camera of the image capturing module on target 170 under constant lighting conditions.

In an embodiment, the operator can perform a field calibration assessment discussed below. For example, the field calibration assessment can include a successful focus achieved when maximum contrast is obtained between two pixels identifying the boundary of the light and dark portion of calibration pattern of the target 170 (e.g., alternating colors or a checkerboard pattern). In one embodiment, the user then locks the focusing mechanism of the image capturing module. In another embodiment, the operator can identify an image displayed on the computer, the user observes a black or white region on the target 170 in the middle of a field of view of the camera. For example, the field of view can represent an angle through which the camera of the image capturing module picks up electromagnetic radiation. In one embodiment, the field of view can be limited by the area of the image displayed on the computer.

In another embodiment, the operator of the computer can count the number of light or dark pixels in a first direction for a lateral pitch distance of the end plates 180. In one embodiment, the first direction is parallel to an axis of the end plates 180. In another embodiment, a lateral OPS is calculated by dividing the lateral pitch distance by the number of pixels in the lateral pitch distance. For example, if the lateral pitch distance equals one inch and the number of pixels for the one-inch pitch distance is 52, the lateral OPS equals one inch divided by 52, which equals 0.01923 inches per pixel. In one embodiment, the lateral OPS can indicate a true physical dimension represented by one pixel at a prescribed working distance. For example, the working distance can include a distance between the camera and the target. In another embodiment, the lateral OPS can be determined based on a field calculation as follows:

$$OPS_{lateral} = \frac{P_{target}}{n_{pixels}}.$$

Where $P_{target}$ the pitch of the target in units of length, and $n_{pixels}$ is a determined number of pixels. For example, the determined number of pixels can include a number of pixels counted by the operator.

Alternatively, the determined number of pixels can include a number of pixels based on characteristics of the camera, such as image size, lens dimensions, and image resolution. In one embodiment, measuring and calibrating the lateral OPS ensures that the objects depicted in images captured by the image capturing module are properly proportioned and that no data is lost between pixels when the image capturing module is in field operation. In another embodiment, the pixels are square or approximately square (e.g., having an equal length and width within a two percent tolerance). For example, an allowance can be permitted due the limitations of the camera of the image capturing module and/or a vehicle encoder (e.g., vehicle encoder 120).

In another embodiment, the field calibration assessment can include determining a vehicle encoder rate for the vehicle encoder based on the lateral OPS. In one embodiment, the vehicle encoder rate can equal the number of electrical pulses generated by the vehicle encoder in one revolution of the shaft of the wheel. For example, the vehicle encoder rate can be calculated as the circumference of the wheel divided by the lateral OPS. In another embodiment, the vehicle encoder rate for the vehicle encoder is determined based on the lateral OPS. For example, the encoder rate is based on the following equation:

$$R_{encoder,wheel} = \frac{(k_{fg}) * (c_{wheel})}{OPS_{lateral}}.$$

Where $k_{fg}$ is a triggering factor set in the camera or in software and $c_{wheel}$ is the circumference of the wheel.

In certain embodiments, the encoder rate is programmed into the vehicle encoder as an integer value. For example, the vehicle encoder rate is programmed into the vehicle encoder as an integer value. In one embodiment, the vehicle encoder can be programmed to 1715 or 1716 pulses per revolution. For example, an operator can operate a vehicle (e.g., the vehicle 110) over the target 170 at a low speed. In one embodiment, the low speed can be within a range of five to twenty mph (e.g., 10 mph). In another embodiment, the image capturing module captures images while the rail vehicle is traveling the low speed and communicates the collected images to the computer. In one embodiment, the operator of the computer determines (e.g., counts) the number of light or dark pixels in a second direction in one longitudinal pitch distance on the target 170. For example, in the illustrated embodiment of FIG. 3, the second direction is parallel to an axis of the target 170.

The operator then operates the vehicle at a high speed. The high speed can be within a range of fifty to eighty miles per hour (mph) (e.g., 65 mph). The high speed can represent the maximum speed of the vehicle. The mage capturing module collects images while the vehicle is at the high speed and communicates the collected images to the computer. The operator of the computer determines (e.g., counts) the number of light or dark pixels in one pitch distance on the target 170 in the second direction. The high and low speed longitudinal pixel counts are compared to the lateral pixel counts to determine if the camera pixels are representing physical space equally in the lateral and longitudinal directions. If the longitudinal pixel counts are different than the lateral pixel counts, a different encoder rate can be programmed into the vehicle encoder, and the above process can be repeated to compare the effects of the new encoder rate on the pixel counts in the lateral and longitudinal directions.

Figure 4:
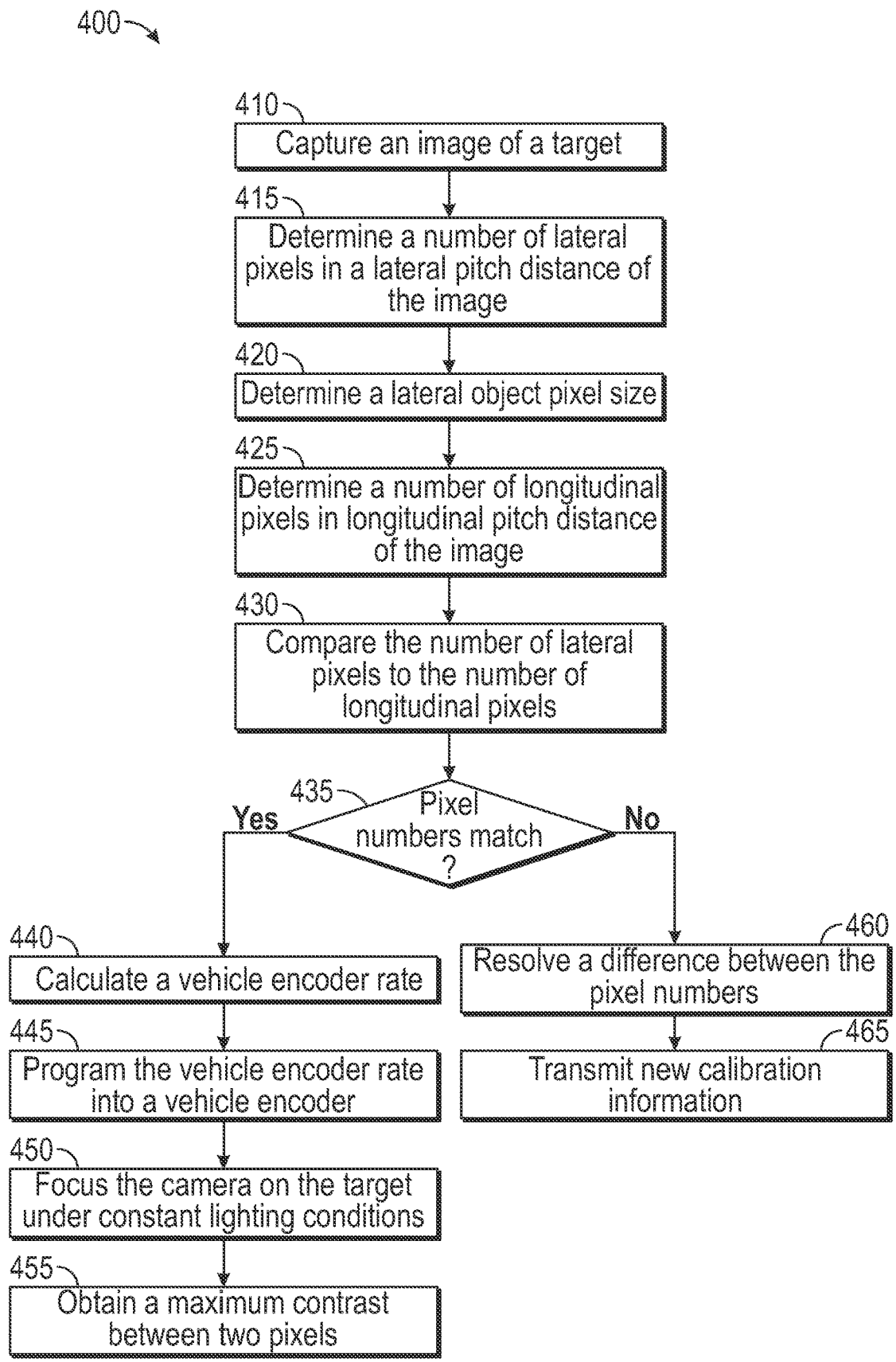
FIG. 4 illustrates a flowchart for field calibrating an image capturing module, in accordance with one or more exemplary embodiments of the present disclosure.

FIG. 4 illustrates a flowchart exemplifying field calibration control logic 400, in accordance with one or more embodiments of the present disclosure. The field calibration control logic 400 can be implemented as an algorithm on a server, a machine learning module, a client, a database, or other suitable system. Additionally, the field calibration control logic 400 can implement or incorporate one or more features of the image capturing module 140. The field calibration control logic 400 can be achieved with software, hardware, an application programming interface (API), a network connection, a network transfer protocol, HTML, DHTML, JavaScript, Dojo, Ruby, Rails, other suitable applications, or a suitable combination thereof.

The field calibration control logic 400 can leverage the ability of a computer platform to spawn multiple processes and threads by processing data simultaneously. The speed and efficiency of the field calibration control logic 400 can be greatly improved by instantiating more than one process to implement data lifecycle management. However, one skilled in the art of programming will appreciate that use of a single processing thread can also be utilized and is within the scope of the present disclosure.

In one embodiment, commands or data can be received via user input generated on a client or server, such as a screen tap, swipe, mouse click, key press, voice command, or other suitable mechanism. In another embodiment, the inspection commands or data can include inspection data having one or more fields, parameters, characteristics, or metadata, related to an inspection. The field calibration control logic 400 then proceeds to step 410.

At step 410, in an embodiment, the control logic 400 can capture a first image of a target. For example, a camera of an image capturing module (e.g., camera 210 of image capturing module 140 of FIG. 2) captures a first image of a target (e.g., target 170 of FIG. 1). In one embodiment, the image capturing module can be secured to a vehicle (e.g., vehicle 110 of FIG. 1) and the target can be secured to a roadway (e.g., roadway 112 of FIG. 1). In another embodiment, the target is perpendicular to the axis of the camera of the image capturing module. In one embodiment, the image captured by the camera of the image capturing module can be displayed on a computer (e.g., computer 150 of FIG. 1) communicatively coupled to the image capturing module. The control logic 400 proceeds to step 415.

At step 415, in an embodiment, the control logic 400 can determine a number of lateral pixels in a lateral pitch distance of the image of the target. For example, the number of lateral pixels can correspond to a known distance, such as a length of the marker strip 304. In one embodiment, the control logic 400 can include a determination by an operator of a number of lateral pixels in the lateral pitch distance of the image of the target. Alternatively, In one embodiment, the number of lateral pixels is automatically determined using a software tool. For example, the software tool can identify a characteristic of the camera to determine a width of pixels of the image and calculate the number of lateral pixels based on a ratio of the lateral pitch distance to the width of the image. In one embodiment, the characteristic of the camera is the resolution of the camera, such as a number of pixels in the image. In one embodiment, the operator can observe the current focus of the camera under constant lighting conditions. In another embodiment, if the contrast between two pixels identifying the boundary of light and dark portions of the focus target is less than observed in bench testing, the operator can unlock the focus mechanism and adjust the focus until a satisfactory result is obtained. The focus mechanism is then locked. In another embodiment, the operator can count the number of light or dark pixels in a lateral pitch distance of the target at the center of the field of view for the camera. The control logic 400 proceeds to step 420.

At step 420, in an embodiment, the control logic 400 can determine a lateral OPS. For example, the lateral OPS can be determined using the determined number of lateral pixels. In one embodiment, the control logic 400 can include the operator calculating the lateral OPS by dividing the pitch (e.g., one inch) of the target 170 by the number of lateral pixels in the pitch region. In one embodiment, the computer can calculate the vehicle encoder rate based on an OPS of the image. In another embodiment, the vehicle encoder rate can be calculated based on the operator observing a black or white region on the target 170 in the middle of a field of view of the camera. For example, the field of view can represent an angle through which the camera of the image capturing module picks up electromagnetic radiation. The field of view can be limited by the area of the image displayed on the computer. In one embodiment, the operator of the computer can count the number of light or dark pixels in a first direction for a lateral pitch distance of the end plates 180. For example, the first direction is parallel to an axis of the end plates 180. In one embodiment, the lateral OPS is calculated by dividing the lateral pitch distance by the number of pixels in the lateral pitch distance. For example, if the lateral pitch distance equals one inch and the number of pixels for the one-inch pitch distance is 52, the OPS equals one inch divided by 52, which equals 0.01923 inches per pixel. In one embodiment, the lateral OPS indicates the true physical dimension represented by one pixel at the prescribed working distance.

In another embodiment, the working distance can include a distance between the camera and the target. In another embodiment, the lateral OPS can be determined based on a field calculation as follows:

$$OPS_{lateral} = \frac{P_{target}}{n_{pixels}}.$$

Where $P_{target}$ is the pitch of the target in units of length, and $n_{pixels}$ is a determined number of pixels. For example, the determined number of pixels can include a number of pixels counted by the operator. Alternatively, the determined number of pixels can include a number of pixels based on characteristics of the camera, such as image size, lens dimensions, and image resolution. In one embodiment, measuring and calibrating the lateral OPS ensures that the objects depicted in images captured by the image capturing module are properly proportioned and that no data is lost between pixels when the image capturing module is in field operation. In another embodiment, the pixels are square or approximately square (e.g., having an equal length and width within a two percent tolerance). For example, an allowance can be permitted due the limitations of the camera of the image capturing module and/or a vehicle encoder (e.g., vehicle encoder 120). The control logic 400 proceeds to step 425.

At step 425, in an embodiment, the control logic 400 can determine a number of longitudinal pixels in a longitudinal pitch distance of the image. For example, the number of longitudinal pixels can correspond to a known distance, such as a length of at least one section of the target 170. In one embodiment, the control logic 400 can include a determination by an operator of the number of longitudinal pixels in the longitudinal pitch distance of the image of the target. Alternatively, In one embodiment, the number of longitudinal pixels is automatically determined using a software tool. For example, the software tool can identify a characteristic of the camera to determine a length of pixels of the image and calculate the number of longitudinal pixels based on a ratio of the longitudinal pitch distance to the length of the image. In one embodiment, the characteristic of the camera is the resolution of the camera, such as a number of pixels in the image. In one embodiment, the operator can observe the current focus of the camera under constant lighting conditions. In another embodiment, if the contrast between two pixels identifying the boundary of light and dark portions of the focus target is less than observed in bench testing, the operator can unlock the focus mechanism and adjust the focus until a satisfactory result is obtained. The focus mechanism is then locked. In another embodiment, the operator can count the number of light or dark pixels in the longitudinal pitch distance at the center of the field of view for the camera. The control logic 400 proceeds to step 430.

At step 430, in an embodiment, the control logic 400 can compare the number of lateral pixels to the number of longitudinal pixels. For example, the control logic 400 can include a computer to compare the number of lateral pixels to a number of longitudinal pixels. In one embodiment, the computer can determine whether the number of lateral pixels is larger than the number of longitudinal pixels. Alternatively, an operator can count the pixels in the image to determine the number of lateral pixels and the number of longitudinal pixels. In another embodiment, the camera is formatted to capture the image with an equal number of lateral pixels to longitudinal pixels. The control logic 400 proceeds to step 435.

At step 435, in an embodiment, the control logic 400 can compare the number of lateral pixels to the number of longitudinal pixels. For example, the control logic 400 can include a computer to compare the number of lateral pixels to a number of longitudinal pixels. In one embodiment, the computer can determine whether the number of lateral pixels is larger than the number of longitudinal pixels. Alternatively, the operator can count the number of lateral pixels and the number of longitudinal pixels to determine whether the pixel numbers are different. In one embodiment, the image can include a difference between the number of lateral pixels and the number of longitudinal pixels. For example, the difference in the number of pixels can indicate further calibration procedures are needed. If the number of lateral pixels does not equal the number of longitudinal pixels, the control logic 400 proceeds to step 460. If the number of lateral pixels is equal to the number of longitudinal pixels, the control logic 400 proceeds to step 440.

At step 440, in an embodiment, the control logic 400 can calculate a vehicle encoder rate. For example, the control logic 400 can include the computer to calculate a vehicle encoder rate. In one embodiment, the vehicle encoder rate can equal the number of electrical pulses generated by the vehicle encoder in one revolution of the shaft of the wheel. For example, the vehicle encoder rate can be calculated as the circumference of the wheel divided by the lateral OPS. In another embodiment, the vehicle encoder rate for the vehicle encoder is determined based on the lateral OPS. For example, the encoder rate is based on the following equation:

$$R_{encoder,wheel} = \frac{(k_{fg}) * (c_{wheel})}{OPS_{lateral}}.$$

Where $k_{fg}$ is a triggering factor set in the camera or in software and $c_{wheel}$ is the circumference of the wheel. The control logic 400 proceeds to step 445.

At step 445, in an embodiment, the control logic 400 can program the vehicle encoder rate into a vehicle encoder. For example, the control logic 400 can include the computer to program the vehicle encoder rate into the vehicle encoder. For example, the vehicle encoder rate is programmed into the vehicle encoder as an integer value. In one embodiment, the vehicle encoder can be programmed to 1715 or 1716 pulses per revolution. For example, an operator can operate a vehicle (e.g., the vehicle 110) over the target 170 at a low speed. In one embodiment, the low speed can be within a range of five to twenty mph (e.g., 10 mph). In another embodiment, the image capturing module captures images while the rail vehicle is traveling the low speed and communicates the collected images to the computer. In one embodiment, the operator of the computer determines (e.g., counts) the number of light or dark pixels in a second direction in one longitudinal pitch distance on the target 170. For example, in the illustrated embodiment of FIG. 3, the second direction is parallel to an axis of the target 170. The control logic 400 proceeds to step 450.

At step 450, in an embodiment, the control logic 400 can focus the camera on the target. For example, the control logic 400 can include the computer to focus the camera on the target under constant lighting conditions. In one embodiment, independent lighting sources can be included under the rail vehicle to illuminate the target. In another embodiment, the computer can focus the camera in a manual or an automatic manner. For example, the manual manner of focusing the came can include the operator to generate a virtual focal point on a display of the computer, controlling the camera. Alternatively, the automatic manner of focusing the camera can include a software tool to assess the image and identify optimum focal distances for the lighting environment. For example, the software tool can identify the optimum focal distances based on physical factors of the camera and various environment settings. In one embodiment, the physical factors can include the lens dimensions of the camera, the resolution of the camera, among other camera factors. In another embodiment, the various environment settings can include low lighting environment, supplementing with software filters to increase the contrast of the pixels of the image. The control logic 400 proceeds to step 455.

At step 455, in an embodiment, the control logic 400 can obtain a maximum contrast between two pixels of the image. For example, the control logic 400 can include the computer to obtain the maximum contrast between the two pixels. For example, a successful focus is achieved when maximum contrast is obtained between two pixels identifying a boundary of light and dark portions of a calibration pattern of the target 170 (e.g., alternating colors or a checkerboard pattern). In one embodiment, an operator can lock a focusing mechanism of the image capturing module. For example, the operator can lock the focusing mechanism manually or automatically. In one embodiment, the operator can lock the focusing mechanism manually using various mechanical and electrical components, such as a torque-driven cap to the image capturing module, or other mechanical and electrical locking components.

At step 460, in an embodiment, the control logic 400 can resolve a difference in pixel values between the number of lateral pixels and the number of longitudinal pixels. For example, the control logic 400 can include a computer to resolve the difference between the number of lateral pixels and the number of longitudinal pixels. In one embodiment, the computer can resolve the difference by adjusting the vehicle encoder rate to a new value to compensate for the difference in pixel values. In one embodiment, the rail vehicle can repeat the calibration process to capture images at various speeds and compare pixel vales of the images subsequently to determine whether the image capturing module is appropriately calibrated. In another embodiment, an object of measuring and calibrating an OPS is to ensure the objects depicted in the image are properly proportioned and that no real-world space is lost between pixels of the image capturing module when the image capturing module is in operation. For example, the pixels can be generally square, or slightly larger in the lateral direction. In one embodiment, by making the pixels square or slightly larger in the lateral direction, no real-world space is lost. In another embodiment, some small allowance in the lateral to longitudinal pixel size is permitted given the desired field-of-view, actual working distance, and limitations of the camera and vehicle encoder. The control logic 400 proceeds to step 465.

At step 465, in an embodiment, the control logic 400 can transmit new calibration information. For example, the control logic 400 can include a computer to transmit the new calibration information. For example, the new calibration information can correspond to the adjusted vehicle encoder rate. In another embodiment, the computer transmits the new calibration information over a network.

Modifications, additions, or omissions can be made to method 400 depicted in FIG. 4. Method 400 can include more, fewer, or other steps. For example, method 400 can include programming the initial vehicle encoder rate into the vehicle encoder. As another example, method 400 can include activating the camera of the image capturing module. Steps can be performed in parallel or in any suitable order. While discussed as specific components completing the steps of method 400, any suitable component can perform any step of method 400.

Figure 5:
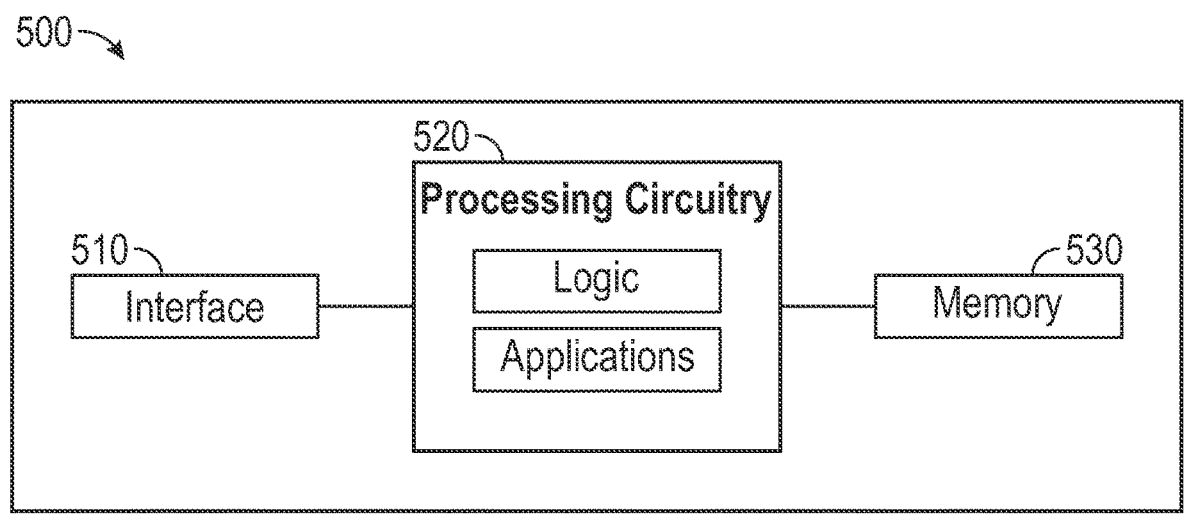
FIG. 5 illustrates a computer system that can be used to achieve the systems and methods described herein, in accordance with one or more exemplary embodiments of the present disclosure.

FIG. 5 shows an example computer system that can be used by the systems and methods described herein. For example, one or more components (e.g., computer 150) of system 100 of FIG. 1 and/or system 300 of FIG. 3 can include one or more interface(s) 510, processing circuitry 520, memory(ies) 530, and/or other suitable element(s). Interface 510 receives input, sends output, processes the input and/or output, and/or performs other suitable operation. Interface 510 can comprise hardware and/or software.

Processing circuitry 520 performs or manages the operations of the component. Processing circuitry 520 can include hardware and/or software. Examples of a processing circuitry include one or more computers, one or more microprocessors, one or more applications, etc. In certain embodiments, processing circuitry 520 executes logic (e.g., instructions) to perform actions (e.g., operations), such as generating output from input. The logic executed by processing circuitry 520 can be encoded in one or more tangible, non-transitory computer readable media (such as memory 530). For example, the logic can comprise a computer program, software, computer executable instructions, and/or instructions capable of being executed by a computer. In particular embodiments, the operations of the embodiments can be performed by one or more computer readable media storing, embodied with, and/or encoded with a computer program and/or having a stored and/or an encoded computer program.

Memory 530 (or memory unit) stores information. Memory 530 can comprise one or more non-transitory, tangible, computer-readable, and/or computer-executable storage media. Examples of memory 530 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Figure 6:
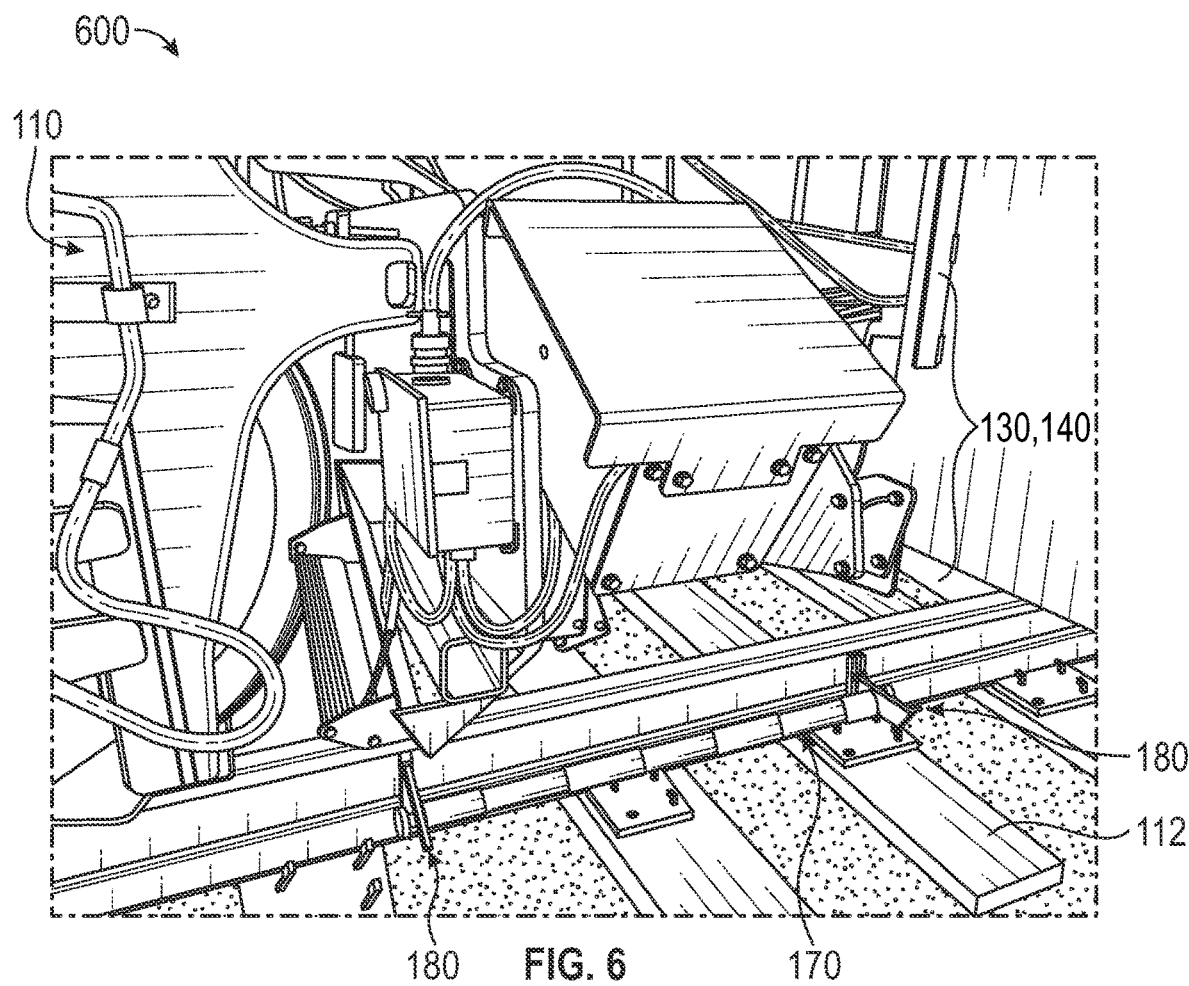
FIG. 6 illustrates a field calibration system for calibrating an image capturing module, in accordance with one or more exemplary embodiments of the present disclosure.

FIG. 6 illustrates an example field calibration system 600 for calibrating an image capturing module 140. The system 600 can include the vehicle 110, the beam 130, one or more image capturing modules 140 (not shown), target 170, and end plates 180. In one embodiment, the beam 130 can include a structure that contains and orients components (e.g., the image capturing module 140) used to capture images. The system 600 can provide a method for the vehicle to travel overtop the roadway 112, the target 170, and the end plates 180. For example, the vehicle 110 can travel along the roadway 112, where the target 170 and endplates 180 are located. In one embodiment, the endplates 180 can position the target 170 in place along the roadway 112 beneath a clearance level of the vehicle 110. In one embodiment, the roadway 112 can include structures along the edge of the roadway 112 to provide support to hold the endplates 180. In this manner, the endplates 180 can stabilize the target 170 to support the target 170 as the vehicle 110 passes over. For example, the endplates 180 can include fasteners to couple the endplates 180 to the support of the roadway 112.

The image capturing module 140 can capture a first image of the target 170, which can be displayed on a computer. An operator can determine a number of lateral pixels in a lateral pitch distance of the first image of the target 170 and determines a lateral OPS by dividing the pitch of the target 170 by the number of lateral pixels in the pitch region. A trial vehicle encoder rate is then determined by dividing the wheel circumference of the vehicle 110 by the lateral OPS. If the trial vehicle encoder rate is different than the initial vehicle encoder rate programmed into a vehicle encoder, the trial vehicle encoder rate is programmed into the vehicle encoder. Image capturing software of the computer is triggered based on a signal from the vehicle encoder and the vehicle 110 is moved forward or backward over the target 170.

The image capturing device 140 can capture second images of the target 170 while the vehicle 110 is moved over the target 170. An operator of the computer can determine (e.g., counts) a number of light or dark longitudinal pixels in one longitudinal pitch distance of each of the second images and can compare the number of lateral pixels to the number of longitudinal pixels. If the number of lateral pixels matches the number of longitudinal pixels, the image capturing module 140 and the vehicle encoder are calibrated. If the number of lateral pixels is different from the number of longitudinal pixels, the vehicle encoder rate can be adjusted until number of lateral pixels matches the number of longitudinal pixels. As such, the system 600 can be used to calibrate the image capturing module 140 to ensure sufficient images are captured by the system 600 that can be used to accurately identify objects in the environment surrounding the vehicle 110.

In one embodiment, the end plates 180 can include components small and light enough to be movable for the operator. For example, the end plates 180 can couple to the roadway 112 by a mechanical, electrical, or magnetic manner. In one embodiment, the end plates 180 can include a mechanical component such as a clamp, bolt, screw, cotter pin, or some other mechanical coupler. In another embodiment, the end plates 180 can include an electrical component such as an electromechanical clamp, electromagnetic coupler, or some other electrical coupler. In another embodiment, the end plates 180 can include a magnetic component such as a magnetic disc, strip, or paint manually placed by the operator. In another embodiment, the end plates 180 can be removable from the roadway 112.

In one embodiment, the endplates 180 can provide sufficient structure such that the target 170 remains parallel with the direction of travel of the roadway 112. For example, the image capture module 140 can capture images of the roadway 112 as the vehicle 110 travels over the target 170 and the endplates 180. In this manner, the image capture module 140 can capture at least one image of the target 170 and the endplates 180 along the roadway 112. The vehicle 110 can travel over the target 170 and endplates 180 to capture subsequent images providing a quantity of images for calibrating the image capture module 140.

The present disclosure achieves at least the following advantages:
1. enables accurate calibration of an image capturing module in the field of use;
2. enables modular calibration based on a calibration bar attachable and detachable to a railway; and
3. provides a portable system for calibration simplifying current calibration techniques.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) can be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure can be embodied in other specific forms without departing from the spirit or essential characteristics thereof. For example, each of the new structures described herein, can be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A field calibration system for calibrating an image capturing module, comprising:
    a target configured to be placed proximate a roadway, the target having a first end and a second end, and including alternating visual markers along a length of the target;
    a vehicle;
    a beam coupled to the vehicle;
    an image capturing module coupled to the beam, wherein the image capturing module having a camera operable to capture an image of the target; and
    one or more controllers configured to receive trigger signals, filter the trigger signals to remove asynchronous signals, and trigger the camera to capture images.

2. The system of claim 1, wherein the roadway is a railroad track.

3. The system of claim 2, wherein the one or more controllers are operable to:
    determine a number of lateral pixels in a lateral pitch distance of the image of the target;
    determine a lateral object pixel size based on the number of lateral pixels;
    determine a number of longitudinal pixels in a longitudinal pitch distance of the image; and
    compare the number of lateral pixels to the number of longitudinal pixels.

4. The system of claim 3, wherein the one or more controllers are further configured to:
    determine, in response to comparing the number of lateral pixels to the number of longitudinal pixels, that the number of lateral pixels matches the number of longitudinal pixels; and
    calculate a vehicle encoder rate based on a field calibration assessment.

5. The system of claim 4, wherein the field calibration assessment includes a field calculation of the lateral object pixel size based on the number of lateral pixels and a determined number of pixels.

6. The system of claim 1, further comprising:
    a first end plate coupled to the first end of the target;
    a second end plate coupled to the second end of the target; and
    a marker strip having a known lateral distance operably coupled to the first end plate.

7. The system of claim 1, wherein each visual marker of the alternating visual markers have a same length.

8. The system of claim 1, wherein the alternating visual markers alternate between at least two colors.

9. The system of claim 1, wherein the one or more controllers are further configured to program a vehicle encoder rate into a vehicle encoder coupled to a wheel of the vehicle.

10. The system of claim 9, wherein the vehicle encoder rate is based on a relation of a triggering factor, a wheel circumference, and the object pixel size.

11. A field calibration method for calibrating an image capturing module, comprising:
- placing a target proximate a roadway, the target having a first end and a second end, and including alternating visual markers along a length of the target;
- receiving one or more trigger signals;
- filtering the trigger signals, via one or more controllers, to remove asynchronous signals; and
- triggering a camera of an image capturing module coupled to a vehicle to capture an image of the target.

12. The method of claim 11, wherein the roadway is a railroad track.

13. The method of claim 12, further comprising:
- determining, via the one or more controllers, a number of lateral pixels in a lateral pitch distance of the image of the target;
- determining, via the one or more controllers, a lateral object pixel size based on the number of lateral pixels;
- determining, via the one or more controllers, a number of longitudinal pixels in a longitudinal pitch distance of the image; and
- comparing, via the one or more controllers, the number of lateral pixels to the number of longitudinal pixels.

14. The method of claim 13, further comprising:
- determining, via the one or mor controllers, in response to comparing the number of lateral pixels to the number of longitudinal pixels, that the number of lateral pixels matches the number of longitudinal pixels; and
- calculating, via the one or mor controllers, a vehicle encoder rate based on a field calibration assessment.

15. The method of claim 14, wherein the field calibration assessment includes a field calculation of the lateral object pixel size based on the number of lateral pixels and a determined number of pixels.

16. The method of claim 11, further comprising:
- coupling a first end plate coupled to the first end of the target; and
- coupling a second end plate coupled to the second end of the target.

17. The method of claim 11, wherein each visual marker of the alternating visual markers have a same length.

18. The method of claim 11, wherein the alternating visual markers alternate between at least two colors.

19. The method of claim 11, further comprising programming, via the one or more controllers, a vehicle encoder rate into a vehicle encoder coupled to a wheel of the vehicle.

20. The method of claim 19, wherein the vehicle encoder rate is based on a relation of a triggering factor, a wheel circumference, and the object pixel size.

* * * * *